US012698955B2

(12) United States Patent
Jernigan et al.

(10) Patent No.: US 12,698,955 B2
(45) Date of Patent: Aug. 4, 2026

(54) ROLL-OVER RESISTANT MEASURING TAPE

(71) Applicant: Apex Brands, Inc., Apex, NC (US)

(72) Inventors: Riley Owen Jernigan, Charlotte, NC (US); Kai Zhang, Charlotte, NC (US); Mark Ezzo, Troutman, NC (US)

(73) Assignee: Apex Brands, Inc., Apex, NC (US)

( * ) Notice: Subject to any disclaimer, the term of this patent is extended or adjusted under 35 U.S.C. 154(b) by 336 days.

(21) Appl. No.: 18/272,147

(22) PCT Filed: Jan. 19, 2022

(86) PCT No.: PCT/US2022/012955
§ 371 (c)(1),
(2) Date: Jul. 13, 2023

(87) PCT Pub. No.: WO2022/159476
PCT Pub. Date: Jul. 28, 2022

(65) Prior Publication Data
US 2024/0077293 A1 Mar. 7, 2024

Related U.S. Application Data

(60) Provisional application No. 63/140,016, filed on Jan. 21, 2021.

(51) Int. Cl.
*G01B 3/1003* (2020.01)
*G01B 3/10* (2020.01)

(52) U.S. Cl.
CPC .... *G01B 3/1003* (2020.01); *G01B 2003/1058* (2013.01)

(58) Field of Classification Search
CPC . G01B 3/1003; G01B 2003/1058; G01B 3/10
(Continued)

(56) References Cited

U.S. PATENT DOCUMENTS 4,352,244 A 10/1982 Tomuro
6,804,899 B2 10/2004 Murray
(Continued)

FOREIGN PATENT DOCUMENTS

CN 2359659 Y 1/2000
CN 202420334 U 9/2012
(Continued)

OTHER PUBLICATIONS

International Search Report and Written Opinion from International Application No. PCT/US2022/012955 mailed Jun. 2, 2022.
(Continued)

*Primary Examiner* — John E Breene
(74) *Attorney, Agent, or Firm* — Burr & Forman

(57) ABSTRACT

A blade for a measuring tape device may include a first end at which an end hook is configurable, a second end configured to be operably coupled to a reel assembly, a first portion of a metallic strip of material extending between the first end and a transition region, and a second portion of the metallic strip of material extending between the transition region and the second end. A width of the metallic strip of material in the first portion may be less than a width of the metallic strip of material in the second portion.

20 Claims, 11 Drawing Sheets

(58) Field of Classification Search
USPC ........................................................... 33/757
See application file for complete search history.

(56) References Cited

U.S. PATENT DOCUMENTS

| | | | | |
|---|---|---|---|---|
| 2002/0029489 | A1* | 3/2002 | Murray | G01B 3/10 |
| | | | | 33/755 |
| 2005/0028396 | A1 | 2/2005 | Stauffer et al. | |
| 2018/0195847 | A1* | 7/2018 | Khangar | G01B 3/1003 |
| 2020/0122862 | A1 | 4/2020 | Baudassé et al. | |
| 2020/0225017 | A1 | 7/2020 | Orsini | |
| 2020/0278189 | A1* | 9/2020 | McKenzie | G01B 3/1056 |

FOREIGN PATENT DOCUMENTS

| | | | | | |
|---|---|---|---|---|---|
| CN | 111989535 | A | | 11/2020 | |
| DE | 19717752 | A1 | * | 10/1998 | G01B 3/1003 |
| FR | 2535840 | A1 | * | 5/1984 | G01B 3/1003 |
| WO | 2020227007 | A1 | | 11/2020 | |

OTHER PUBLICATIONS

The First Office Action from corresponding Chinese Application No. 202280010894.5, mailed Mar. 28, 2026, all pages cited in its entirety.

* cited by examiner

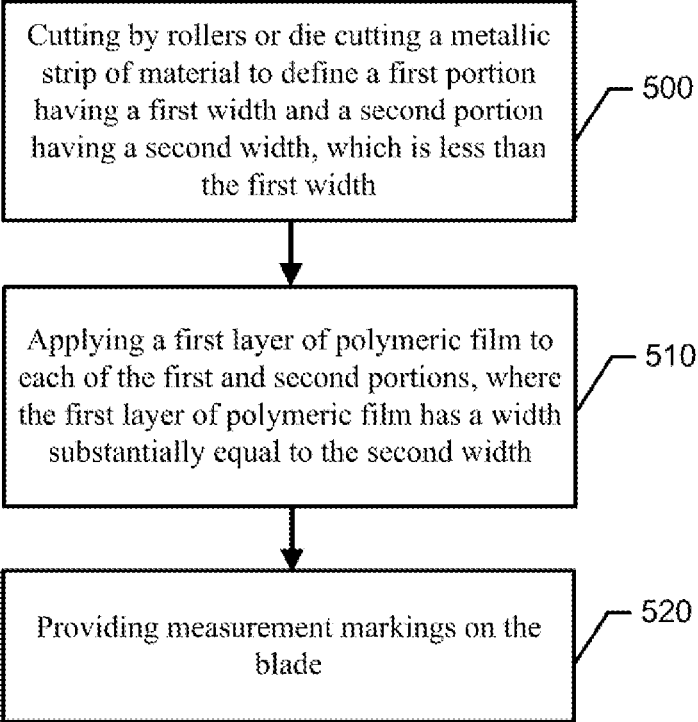

Cutting by rollers or die cutting a metallic strip of material to define a first portion having a first width and a second portion having a second width, which is less than the first width — 500

Applying a first layer of polymeric film to each of the first and second portions, where the first layer of polymeric film has a width substantially equal to the second width — 510

Providing measurement markings on the blade — 520

FIG. 8.

ROLL-OVER RESISTANT MEASURING TAPE

TECHNICAL FIELD

Example embodiments generally relate to measuring tape devices, and particularly relate to a measuring tape that has a blade designed to reduce the incidence of roll-over responsive to blade extension.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For measuring tapes having length in a range of about 12 ft to 50 ft, self-retracting mechanisms and using metallic tape ribbons for the tape (or blade) are very common.

For nearly a century, metallic tape ribbons with a curved (or cupped) and relatively stiff construction have been preferred for use in self-retracting measuring tapes. The metallic tape ribbon tends to be flexible enough to permit the metallic tape ribbon to be wound onto a spring loaded reel assembly, but stiff enough to have a relatively long standout. The cupping of the metallic tape ribbon further enhances the standout without negatively impacting the ability of the metallic tape ribbon to be wound onto the reel assembly. By employing the end hook at one end of the tape, the user may take advantage of the standout to pay out the measuring tape toward an anchor point on a medium that is to be measured and then conduct the measurement without having to physically move to the anchor point to affix the end hook and then move away to make the measurement. Given the time and energy that can be saved by this method of measurement, taking advantage of the standout characteristics of a self-retracting measuring tape is a very popular feature. So much so, in fact, that it is not uncommon to see a user make multiple attempts to utilize standout and catch a remote end of media being measured with the end hook, rather than simply moving to the remote end of the media to manually fix the end hook to the remote end. When the standout is poor, and the user has to use multiple attempts, or fails and must resort to moving to the remote end to affix the end hook, frustration may grow, and the user may seek out a measuring tape with better standout characteristics.

Invariably, each measuring tape will have a certain length that effectively defines the maximum standout that can be achieved before the tape bends and basically collapses. The measuring tape can no longer be extended reliably toward the anchor point once this collapse occurs. However, the collapse that occurs at maximum standout is not the only type of tape bending or collapse that can occur with metallic tape ribbons. In this regard, another collapse phenomena that can occur is called rollover. Rollover occurs when the blade is rotated about the longitudinal axis of the blade. The rotation of the blade about the longitudinal axis may be desirable when measuring vertical surfaces (e.g., walls, doors, windows, etc.).

For maximum standout, the blade is extended with the apex of the convex side of the cupped shape pointing straight toward the ground. As the blade is rotated about the longitudinal axis and extended, even typical blades that are designed for long standout will tend to collapse when the angle of rotation nears 90 degrees at a relatively small amount of extension. Meanwhile, standout characteristics of some blades may enable extension of greater than 10 feet or 12 feet. Thus, it may be desirable to improve anti-rollover characteristics to decrease the gap between the maximum standout and the length at which rollover occurs.

BRIEF SUMMARY OF SOME EXAMPLES

Some example embodiments may enable the provision of a measuring tape that has improved anti-rollover characteristics.

In an example embodiment, a measuring tape device may be provided. The measuring tape device may include a housing having an aperture, a reel assembly enclosed within the housing, a blade formed from a metallic strip of material having a first end configured to extend from the housing through the aperture and a second end configured to be wound on the reel assembly, and an end hook disposed at the first end of the blade to engage an object for measurement. A first portion of the metallic strip of material may extend between the first end and a transition region, and a second portion of the metallic strip of material may extend between the transition region and the second end. A width of the metallic strip of material in the first portion may be less than a width of the metallic strip of material in the second portion.

In another example embodiment, a blade for a measuring tape device may be provided. The blade may include a first end at which an end hook is configurable, a second end configured to be operably coupled to a reel assembly, a first portion of a metallic strip of material extending between the first end and a transition region, and a second portion of the metallic strip of material extending between the transition region and the second end. A width of the metallic strip of material in the first portion may be less than a width of the metallic strip of material in the second portion.

In another example embodiment, a method of producing a blade for a tape measuring device may be provided. The method may include cutting by rollers or die cutting a metallic strip of material to define a first portion having a first width and a second portion having a second width, which is less than the first width. The method may further include applying a first layer of polymeric film to each of the first and second portions, where the first layer of polymeric film has a width substantially equal to the second width. The method may also include providing measurement markings on the blade. In some cases, providing the measurement markings on the blade may include a selected one of 1) printing the measurement markings on lateral edges of the metallic strip of material in each of the first and second portions, 2) printing the measurement markings on the first film layer in each of the first and second portions, and 3) printing the measurement markings on a printing medium disposed between the first film layer and a second film layer in the first portion, and disposed between the first film layer and a lateral edge of the metallic strip of material in the second portion.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 8 illustrates a block diagram of a method of making a blade in accordance with an example embodiment.

DETAILED DESCRIPTION

Figure 1:
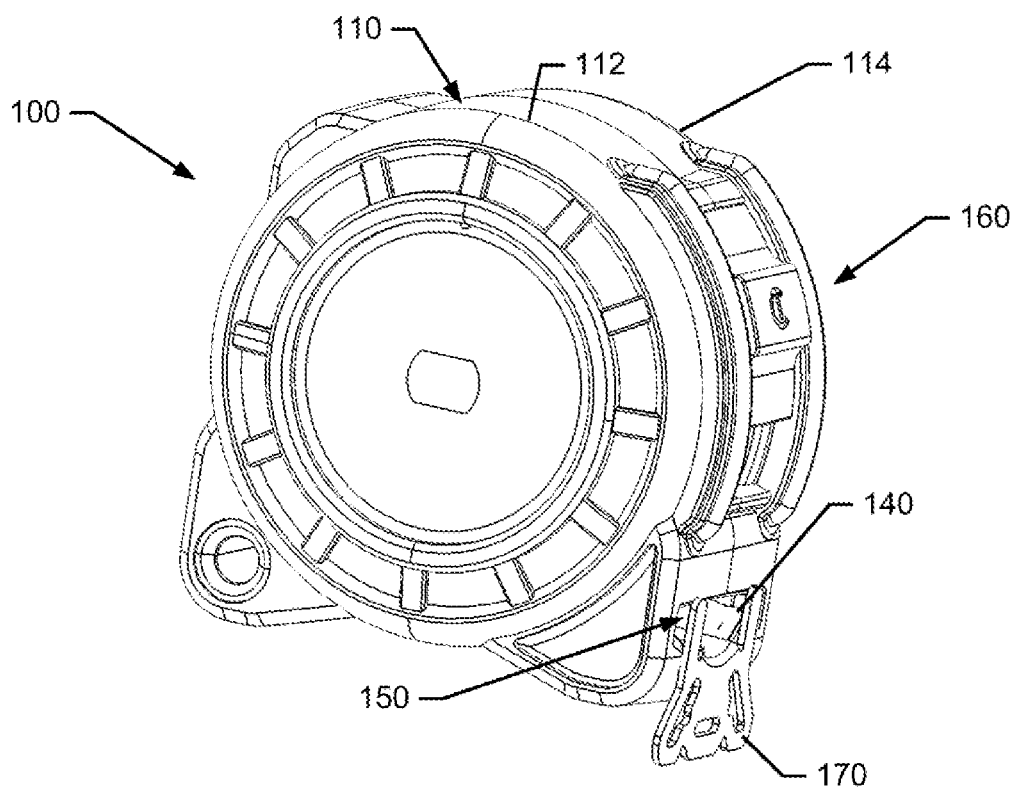
FIG. 1 illustrates a perspective view of a measuring tape device in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a measuring tape device that may have an improved blade design for resistance to rollover. This may be accomplished by providing an anti-rollover treatment to outer lateral portions of the blade extending away from the end hook, and over a limited length of the blade (e.g.). FIG. 1 illustrates a perspective view of a measuring tape device, FIG. 2 illustrates a block diagram of such device, in accordance with an example embodiment, and FIG. 3 (which is defined by FIGS. 3A and 3B) illustrates a front view of the blade of the measuring tape device.

Figure 2:
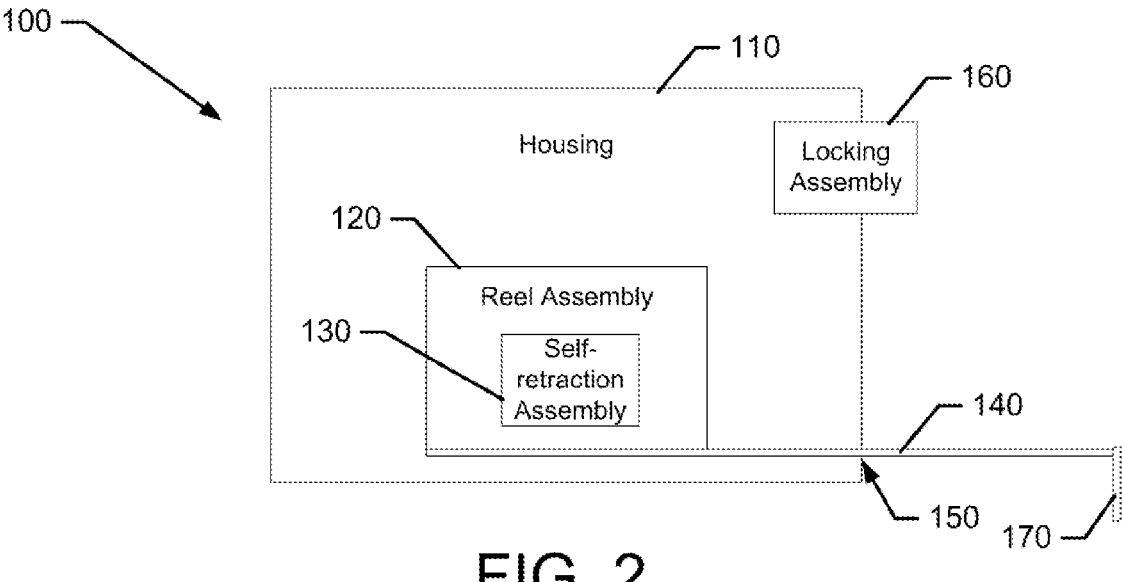
FIG. 2 illustrates a block diagram of the measuring tape device in accordance with an example embodiment.
Figure 3A:
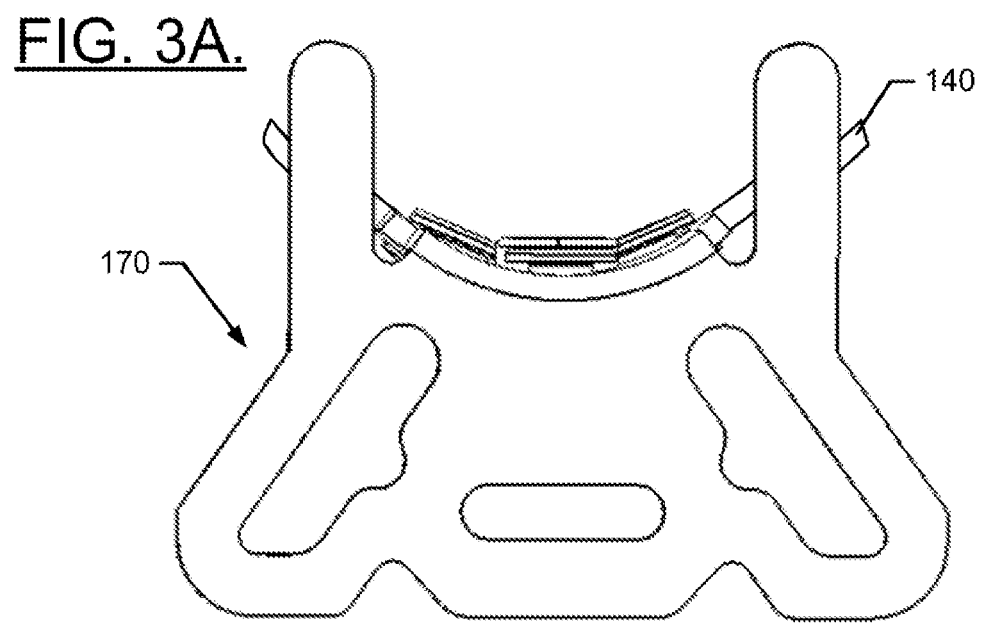
FIG. 3A illustrates a front view of the end hook in a normal orientation in accordance with an example embodiment.

Referring now to FIGS. 1-3, a measuring tape device 100 of an example embodiment may include a housing 110 that, to simplify manufacture, may include a first case half 112 and a second case half 114. The first and second case halves 112 and 114 may house a reel assembly 120 and a self-retraction assembly 130 therein. A blade 140 (or tape) portion of the device 100 may be wound onto the reel assembly 120. The blade 140 may be paid out through an aperture 150 formed in the housing 110. A locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is affixed to the reel assembly 120 at the other end of the blade 140. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

As mentioned above, for a typical measuring tape, when the blade 140 is paid out through the aperture 150, the blade 140 will extend relatively straight out the aperture 150 (although some sagging or droop may be noticed due to the weight of the blade 140). The blade 140 can be extended in a guided fashion toward an intended target anchor point while the blade 140 continues to have sufficient rigidity to standout. The blade 140 will continue to extend and standout until the weight of the blade 140 extended past the aperture 150 is sufficient to cause the blade 140 to collapse and bend, thereby losing its rigidity and preventing any further guided extension. The loss of sufficient rigidity which causes collapse and bending of the blade 140 at a length of maximum standout generally occurs at a portion of the blade 140 that can be referred to as a "critical region" since it can occur at slightly different points (but generally in the same region) on different extension operations, and on different individual measuring tapes.

Figure 3B:
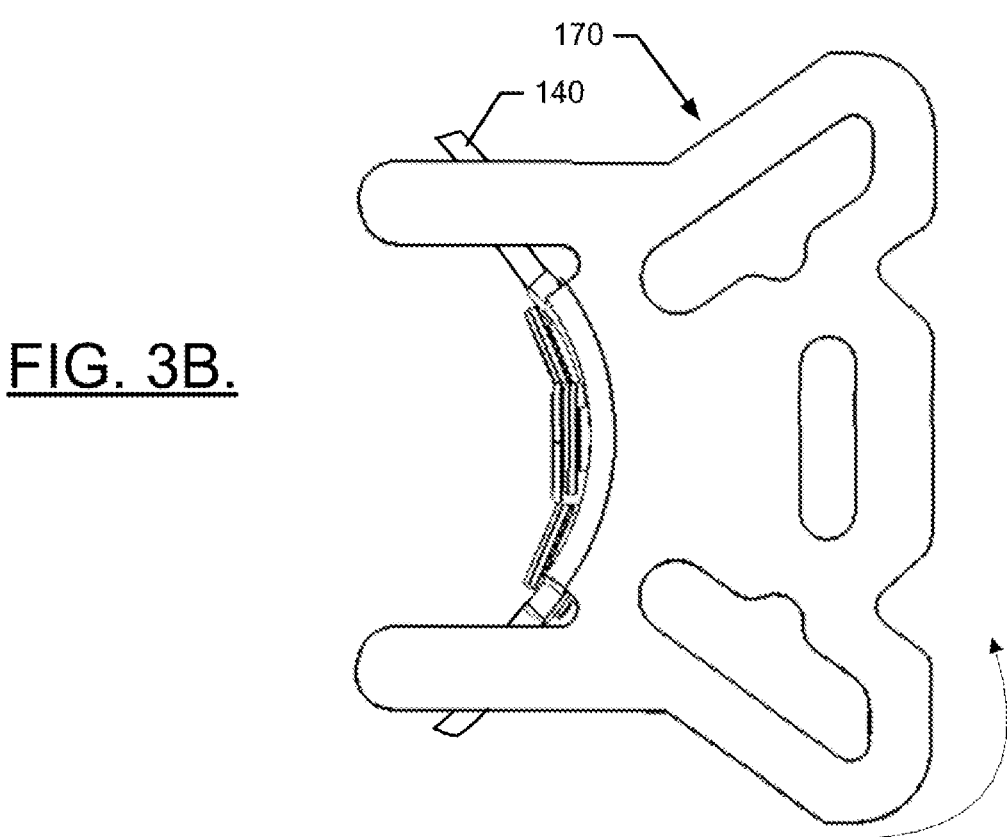
FIG. 3B illustrates the end hook rotated about ninety degrees about a longitudinal axis of the blade in accordance with an example embodiment.

It may be possible to increase the standout capabilities of the blade 140 by changing certain characteristics of the blade 140. For example, the cupping of the blade 140 such that a convex curve having an apex that is generally faced toward the ground when the blade 140 is extended to achieve maximum standout is well known to improve standout of the blade 140. This is the orientation shown in FIG. 3A. However, the blade 140 is not always paid out (or held) in this orientation. To the contrary, in some cases, measurement of vertical surfaces or structures may call for paying the blade 140 out of the housing 110 at an angled orientation (e.g., rotated about the longitudinal axis of the blade 140 as much as by 90 degrees, and generally at greater than 60 degrees). FIG. 3B shows the blade 140 and end hook 170 rotated by 90 degrees so that the apex of the convex side of the cupped blade is now rotated 90 degrees and to the viewer's right. For a typical blade that is constructed to have improved standout, a collapse or bending phenomenon referred to as rollover (which is similar to that which occurs at maximum standout in terms of the collapse or bending of the blade 140 that occurs) can occur at a corresponding critical region for rollover. The critical region for rollover for many cupped blades often tends to occur at between three to four feet of extension out of the housing 110. Moreover, it should also be appreciated that "cupping" need not be achieved with a smooth curve. Cupping could also be achieved with other geometries that are not smooth or that change in the amount of curvature over different parts of the width of the blade 140.

Figure 4A:
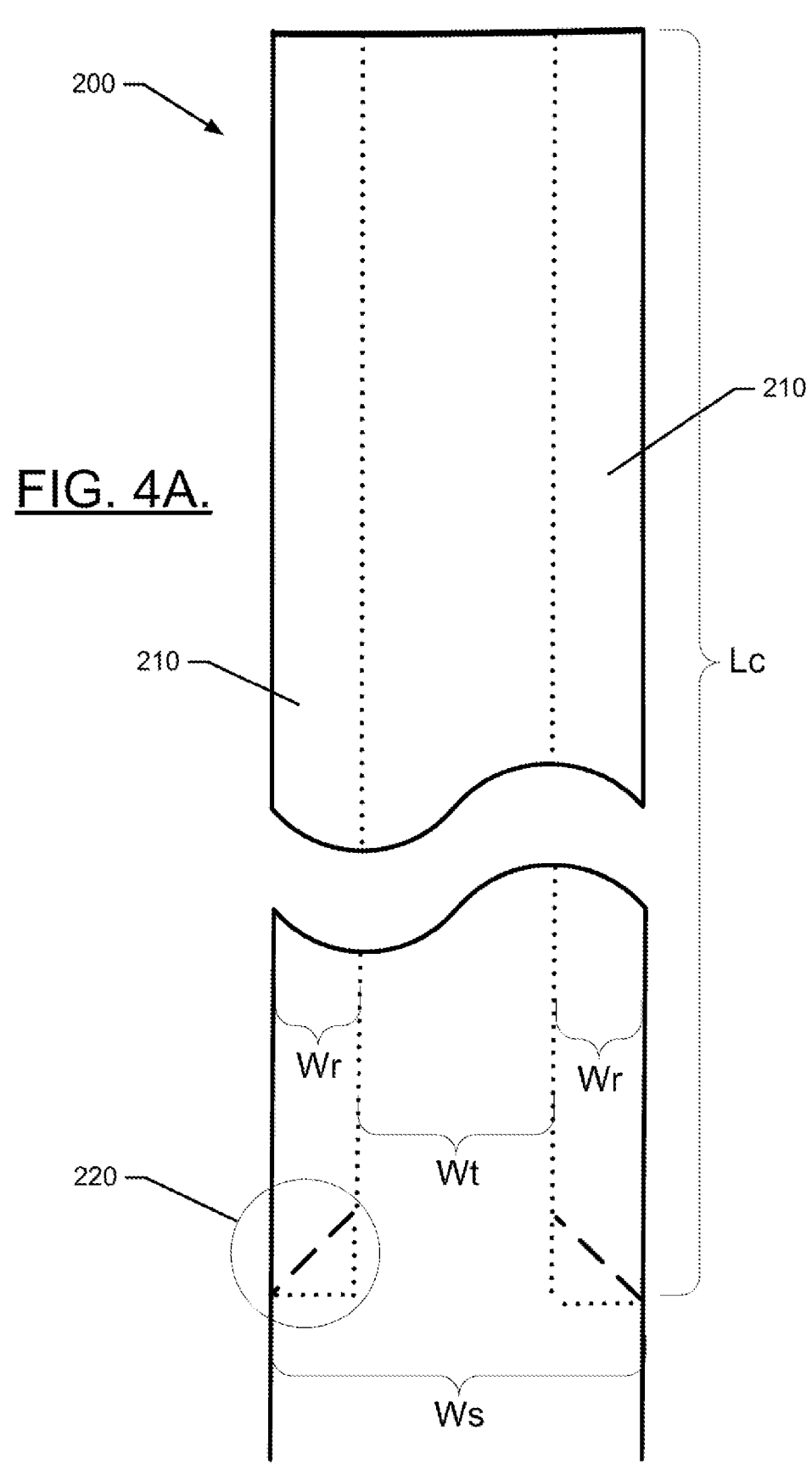
FIG. 4A illustrates a top plan view of a metallic strip having rollover treatment of an example embodiment applied thereto.
Figure 4B:
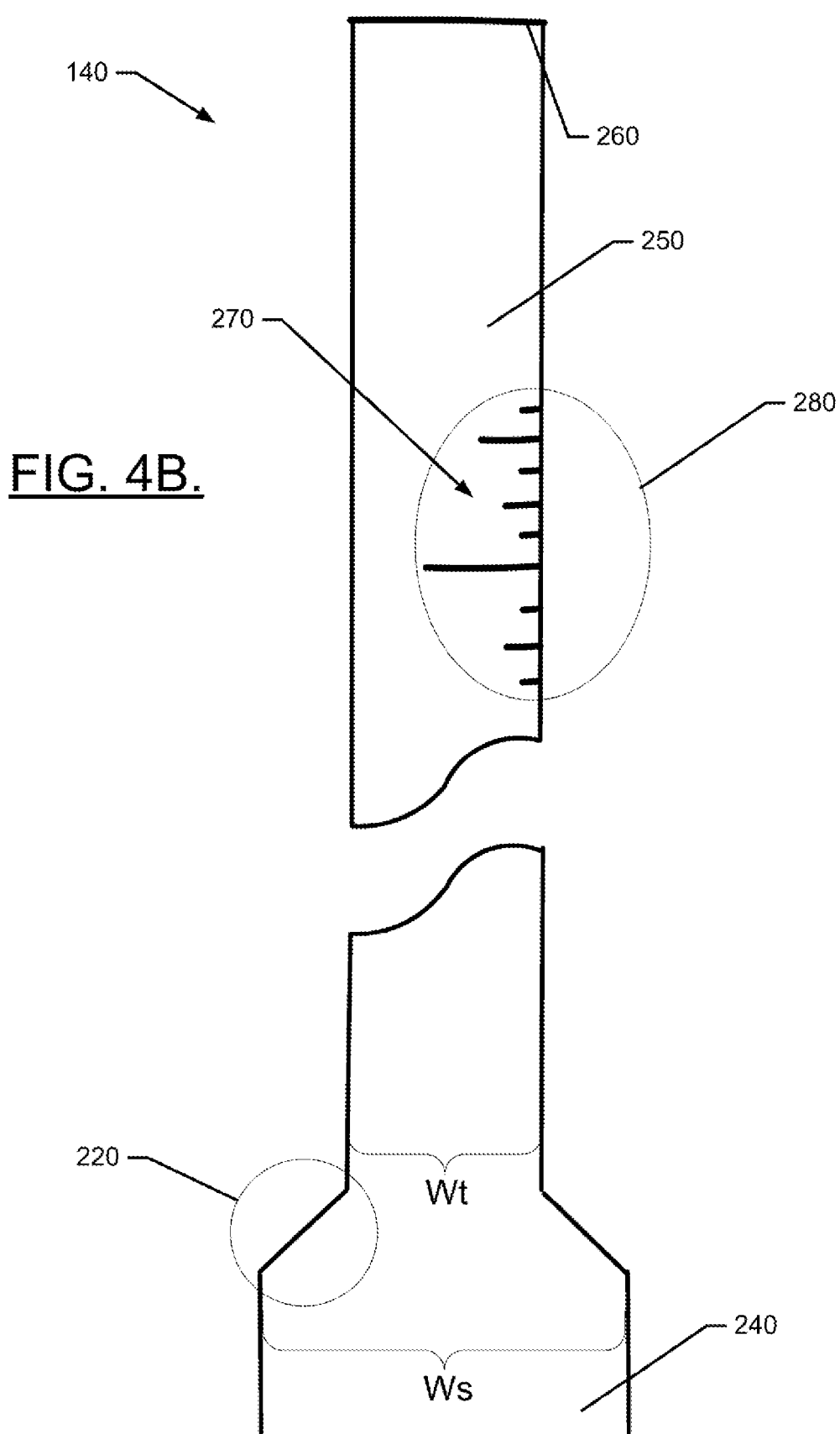
FIG. 4B illustrates a top plan view of a blade cut in accordance with the anti-rollover treatment of an example embodiment.
Figure 4C:
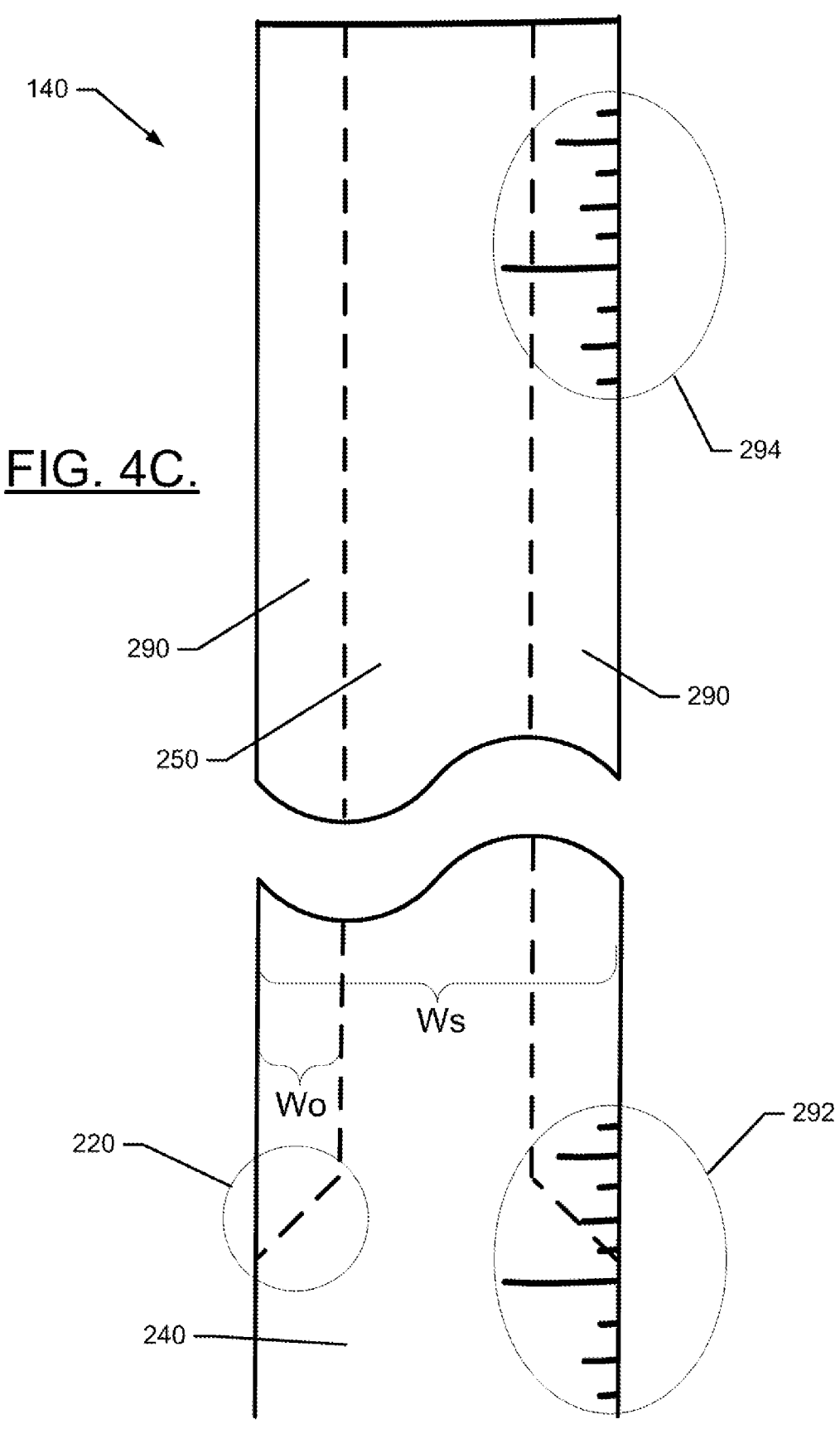
FIG. 4C illustrates a top plan view of the blade following application of a film in accordance with an example embodiment.

This critical region for rollover can, however, be extended by modifying the structure of the blade 140 (or at least the portion extending rearward from the end hook 170 for a given distance). In this regard, by adding an anti-rollover treatment to lateral sides of the blade 140 over the given distance, the amount of extension of the blade 140 that can be achieved before rollover occurs may be increased. FIG. 4, which is defined by FIGS. 4A, 4B and 4C, illustrates one example of how this treatment may be accomplished.

FIG. 4A illustrates a top view of an elongate metallic strip 200 that may ultimately be formed into the blade 140. In this regard, the metallic strip 200 may have a width (Ws) that is substantially consistent over the entire length of the metallic strip 200. Meanwhile, the length of the metallic strip 200 may be selected for a standard length of a tape measure device (e.g., 12 ft., 25 ft., 50 ft., etc.). To apply the ant-rollover treatment of an example embodiment, material removal from lateral sides 210 of the metallic strip 200 may be accomplished. In some cases, a selected length (Lc) of the metallic strip 200 (e.g., up to about 48 inches, although the Lc may be longer in some cases) may have the lateral sides 210 removed therefrom. For example, the lateral sides 210 may have a removal width (Wr) that is cut away from the metallic strip 200. The width of the remaining material after removal of the lateral sides 210 may have a treated width (Wt). In an example embodiment, the removal width (Wr) may be less than about 35%. For example, the removal width (Wr) may be between about 10% to about 33% in some embodiments. Accordingly, the treated width (Wt) may be between about 30% to about 80% of the width (Ws) of the metallic strip 200. However, larger widths are possible including widths up to 90% or 95% of the width (Ws) of the metallic strip 200. FIG. 4B shows the blade 140 formed after removal of the lateral sides 210.

In some embodiments, only two widths (e.g., the treated width (Wt) and the width (Ws) may exist over the length of the blade 140. However, in some examples, a transition region 220 may be defined to provide a smoother transition between the width (Ws) of the metallic strip 200 and the treated width (Wt). The transition region 220 may make the transition between the width (Ws) of the metallic strip 200 and the treated width (Wt) in any desirable way. In this regard, for example, a dashed line in the transition region 220 is used to show a linear taper inserted between the area with the width (Ws) of the metallic strip 200 and the area with treated width (Wt). Meanwhile, the dotted line in the transition region 220 shows a prompt change. Of course, other modifications are also possible including, for example, a curved transition.

After the lateral sides 210 have been removed, the blade 140 shown in FIG. 4B includes an untreated blade portion 240 (with respect to rollover treatment) and a treated blade portion 250 (or tapered portion). As can be appreciated from the description above, the treated blade portion 250 has the treated width (Wt) and extends from a first end 260 of the blade 140 to the transition region 220. The first end 260 of the blade 140 is the end of the blade 140 at which the end hook 170 is affixed later on. The untreated blade portion 240 may have the width (Ws), which is the same as the width (Ws) of the metallic strip 200.

In an example embodiment, the blade 140 may be cupped (before or after removal of the lateral sides 210) to improve standout as noted above. As shown in FIG. 4B, the blade 140 may also have measurement markings 270 disposed on lateral edges thereof. Although the measurement markings 270 are shown only in detail region 280, and only on one lateral side of the blade 140, it should be appreciated, that the measurement markings may be extended over both lateral sides and over an entire length of the blade 140 in some cases. The measurement markings 270 may be associated with standard measurement units such as inches, centimeters, or the like, and fractional portions thereof. In some cases, various coatings and/or films may then be placed on the metallic material of the blade 140. Such coatings or films may add to the strength, rigidity, standout capability, anti-rollover capability, or otherwise enhance certain characteristics of the blade 140. Moreover, in some cases, the films or coatings may be used to host the measurement markings 270 instead of placing the measurement markings 270 directly on the metallic material (or substrate) of the blade 140.

To the extent the measurement markings 270 are printed on the metallic material of the blade 140, such markings may be crammed closer to each other on opposite sides of the blade 140 in the treated blade portion 250 and/or may be difficult to follow in the transition region 220. To avoid this outcome, some example embodiments may provide for the printing of the measurement markings 270 on portions of the film or coating that may be extended past the lateral edges of the metallic material of the blade 140 in the treated blade portion 250. FIG. 4C illustrates an example in which a film 290 is applied to the blade 140. The film 290 may have a width that matches (or substantially matches) the width (Ws) of the metallic strip 200. Thus, in the treated blade portion 250, the film 290 may define an overhang width (Wo), which is substantially equal to the removal width (Wr) of the lateral sides 210 that were removed as described above in reference to FIG. 4A. However, in some cases, the overhang width (Wo) could be larger than the removal width (Wr).

After application of the film 290, a resulting width of the blade 140 is consistent even through the transition region 220. Moreover, by printing the measurement markings 270 on the film 290 instead of on the metallic material, the measurement markings 270 may be located consistently on lateral edges of the blade 140 over the entire length of the blade 140. In this regard, detail region 292 shows the measurement markings 270 being printed on the film 290 through the transition region 220 so that part of the measurement markings 270 are printed over metal, and part of the measurement markings 270 are not. Meanwhile, in detail region 294, the measurement markings 270 are almost entirely (and they could be entirely) printed over the film 290 and not over the metal.

Figure 5:
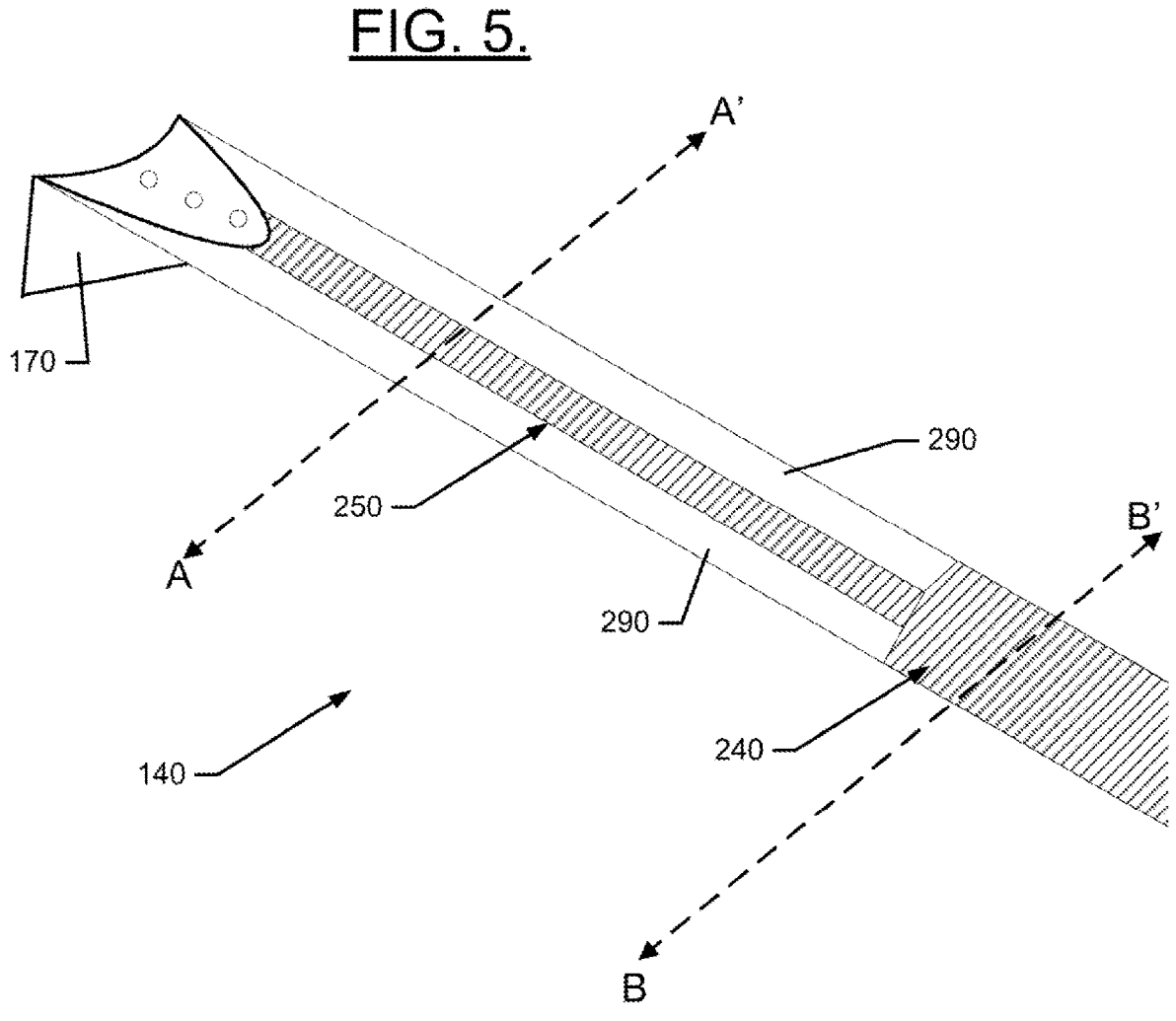
FIG. 5 illustrates a perspective view of the blade with anti-rollover treatment according to an example embodiment.

FIG. 5 illustrates a perspective view of the blade 140 with the end hook 170 attached. As can be seen in FIG. 5, the untreated blade portion 240 has metallic material extending over the full width of the blade 140. Meanwhile, film 290 extends to match the width of the metallic material in the untreated blade portion 240. The film 290 could be applied to either the top of the blade 140 or the bottom of the blade 140. However, in some cases, a layer of the film 290 may be applied to each of the top of the blade 140 and the bottom of the blade 140.

Figure 6A:
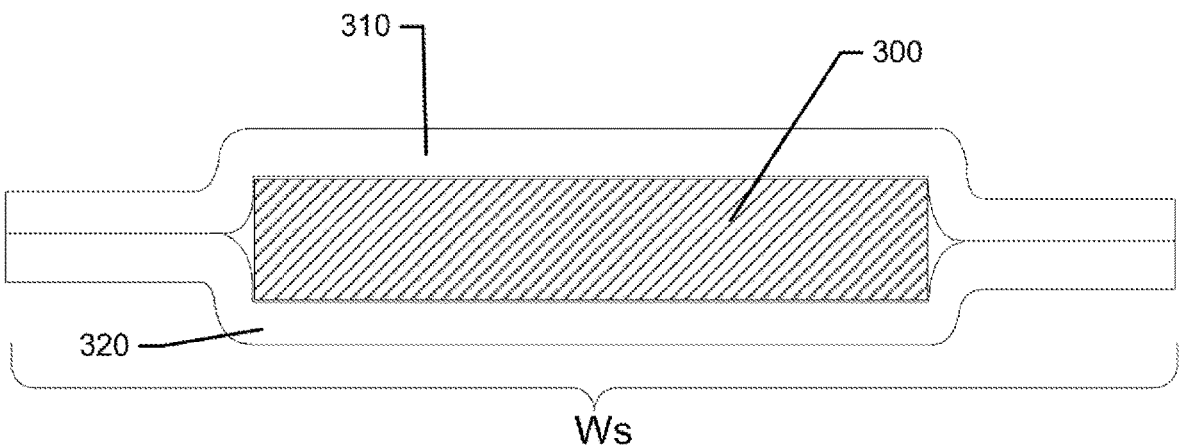
FIG. 6A illustrates a cross section view of a first portion of the blade with films applied according to an example embodiment.
Figure 6B:
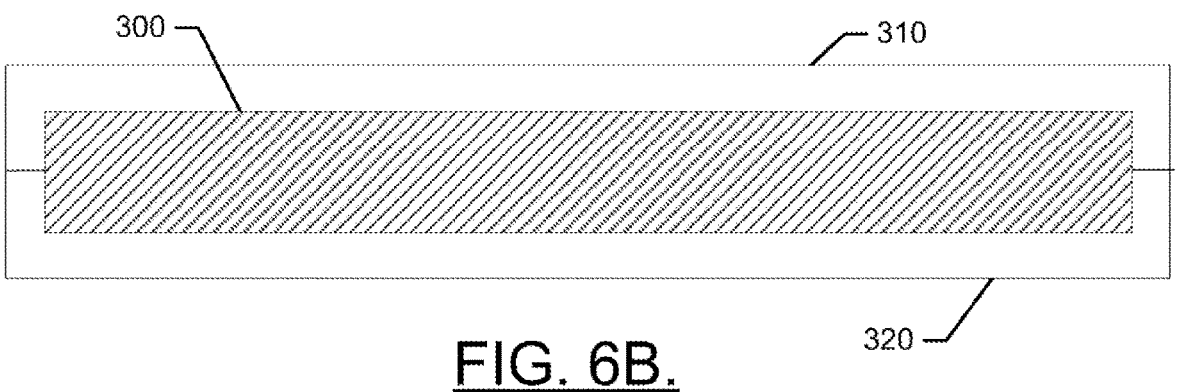
FIG. 6B illustrates a cross section view of a second portion of the blade with films applied according to an example embodiment.

To better illustrate and understand the relationship between the film 290 and the metallic material forming the blade 140 in the treated blade portion 250 and the untreated blade portion 240, cross sections taken along lines A-A' and B-B' have been taken, and such cross section views are shown in FIGS. 6A and 6B, respectively.

Referring first to FIG. 6A, metallic strip material 300 associated with the treated blade portion 250 is covered on a top side thereof by a first film layer 310. The metallic strip 300 is also covered on a bottom side thereof by a second film layer 320. The first film layer 210 and the second film layer 320 may combine to form film 290 of the preceding figures. However, it should also be appreciated that either the first film layer 310 or the second film layer 320 may be used individually to form the film 290 of the preceding figures as well. In an example embodiment, a thickness of the metallic strip material 300 may be about 0.0045 inches. Meanwhile, a thickness of each of the first and second film layers 310 and 320 may be about 0.002 inches (for a total film thickness of 0.004 inches).

As a result of putting the first film layer 310 and second film layer 320 on opposite sides of the metallic strip material 300 in the treated blade portion 250, the metallic strip material 300 is effectively fully encased by film 290 (i.e., top, bottom and lateral sides are all adjacent to a corresponding layer of the film 290). Meanwhile, after passing the transition region 220 of FIG. 4, portions of the blade 140 may have a cross section like that of FIG. 6B. In this regard, the width of the metallic strip material 300 and widths of each of the first and second film layers 310 and 320 may be substantially similar.

Figure 6C:
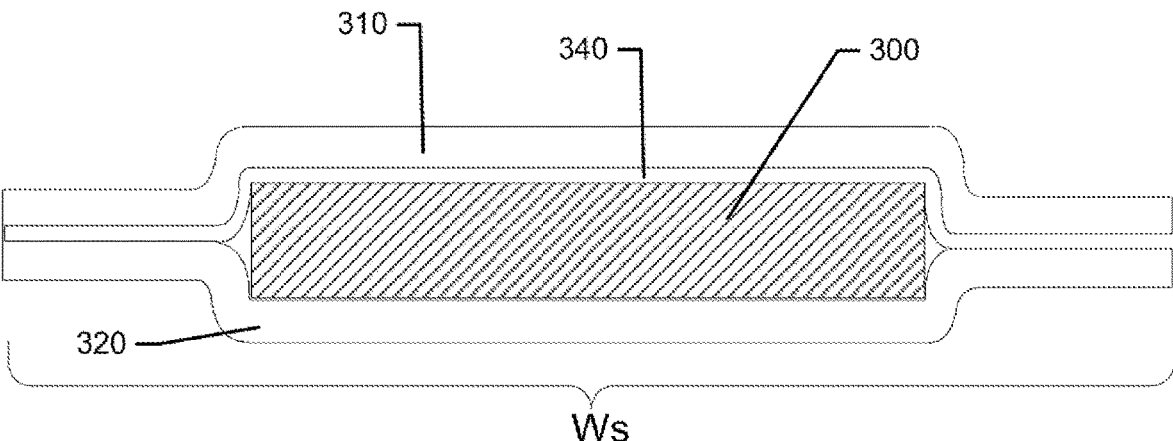
FIG. 6C illustrates a cross section view of the first portion of the blade with films applied over a print medium according to an example embodiment.
Figure 6D:
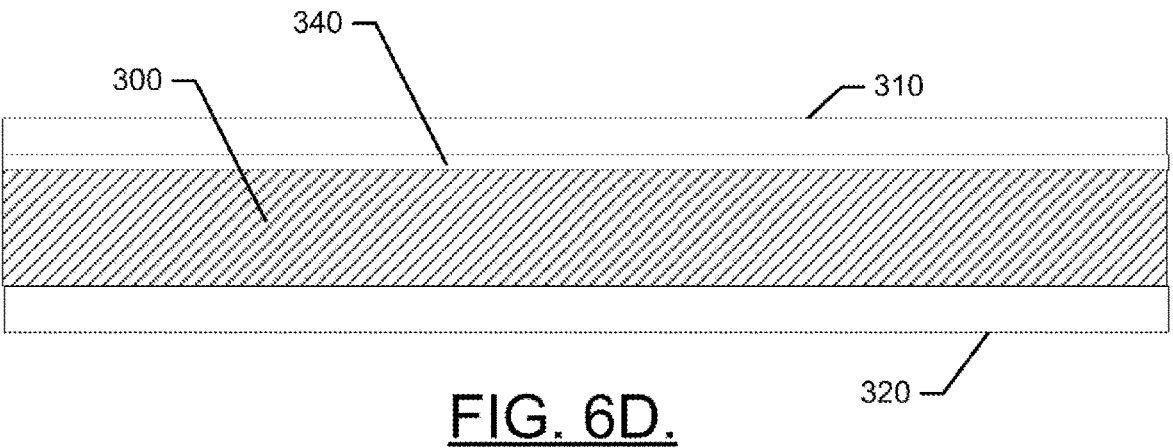
FIG. 6D illustrates a cross section view of a second portion of the blade with films applied over the print medium according to an example embodiment.

As noted above, the use of the film 290 may provide increased options for the provision of the measurement markings 270. These options may also exist within the context of various options associated with a method of manufacturing the blade 140. For example, in some cases, the metallic strip material 200 may be die cut or cut by rollers to transition from the structure of FIG. 4A to the structure of FIG. 4B. After the blade 140 is cut to size, a premade polymeric label (having width (Ws)) with the measurement markings 270 printed thereon may be applied to the top and/or bottom of the blade 140. As an alternative, a paper layer 340 (see FIGS. 6C and 6D) may be inserted between the first film layer 310 and the metallic strip material 300. The measurement markings 270 may be printed on the paper layer 340, which forms merely one example of a printing medium upon which the measurement markings 270 may be printed. In some cases, the paper layer 340 may have any desired color (e.g., yellow) and the measurement markings 270 printed thereon. The paper layer 340 may have adhesives applied to both sides thereof to bind the paper layer 340 to the metallic strip material 300, the first film layer 310 and/or the second film layer 320.

As yet another alternative, the metallic strip material 200 may be die cut or cut by rollers to transition from the structure of FIG. 4A to the structure of FIG. 4B. After the blade 140 is cut to size, the first and/or second film layers 310 and 320 may be applied without the measurement markings 270. Thereafter, the measurement markings 270 may be printed onto the top or bottom of the first film layer 310 and the second film layer 320, respectively. For example, the blade 140 may be run through a printer to apply the measurement markings 270.

Figure 7A:
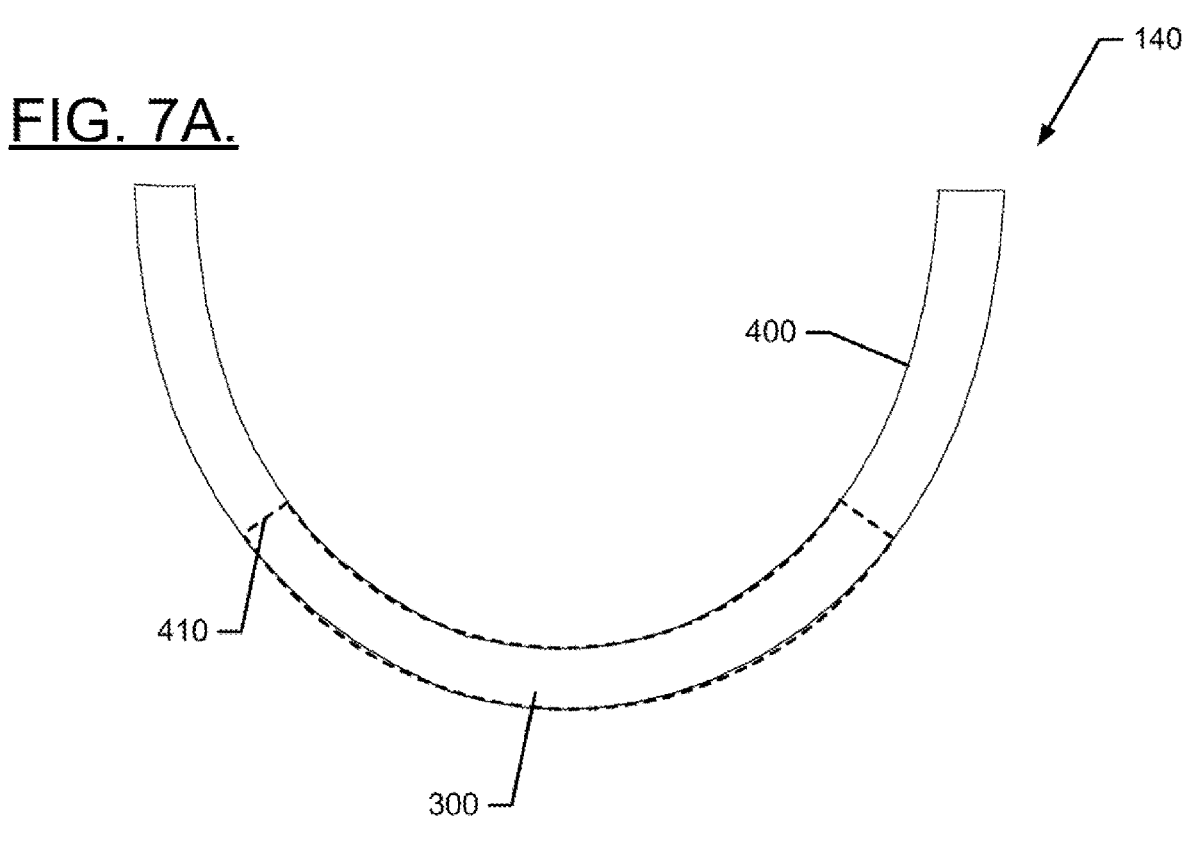
FIG. 7A illustrates a front view of the blade showing similar cupping profiles in all parts of the blade in accordance with an example embodiment.
Figure 7B:
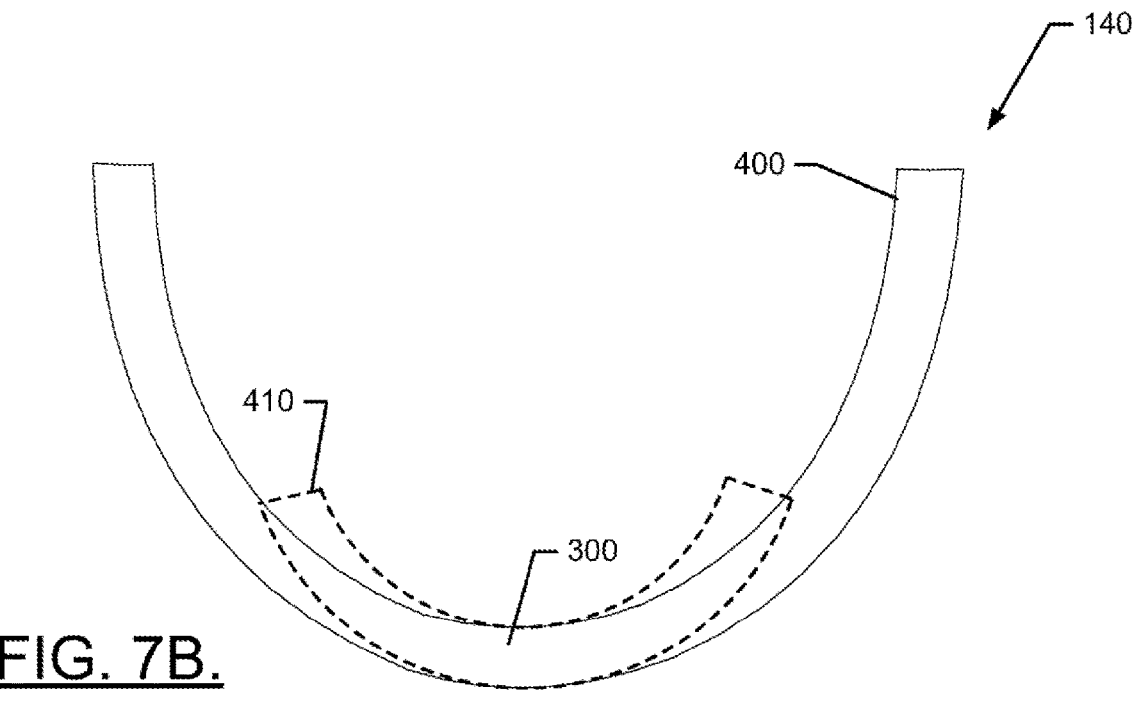
FIG. 7B illustrates a front view of the blade with differences in concavity for different sections in accordance with an example embodiment.
Figure 7C:
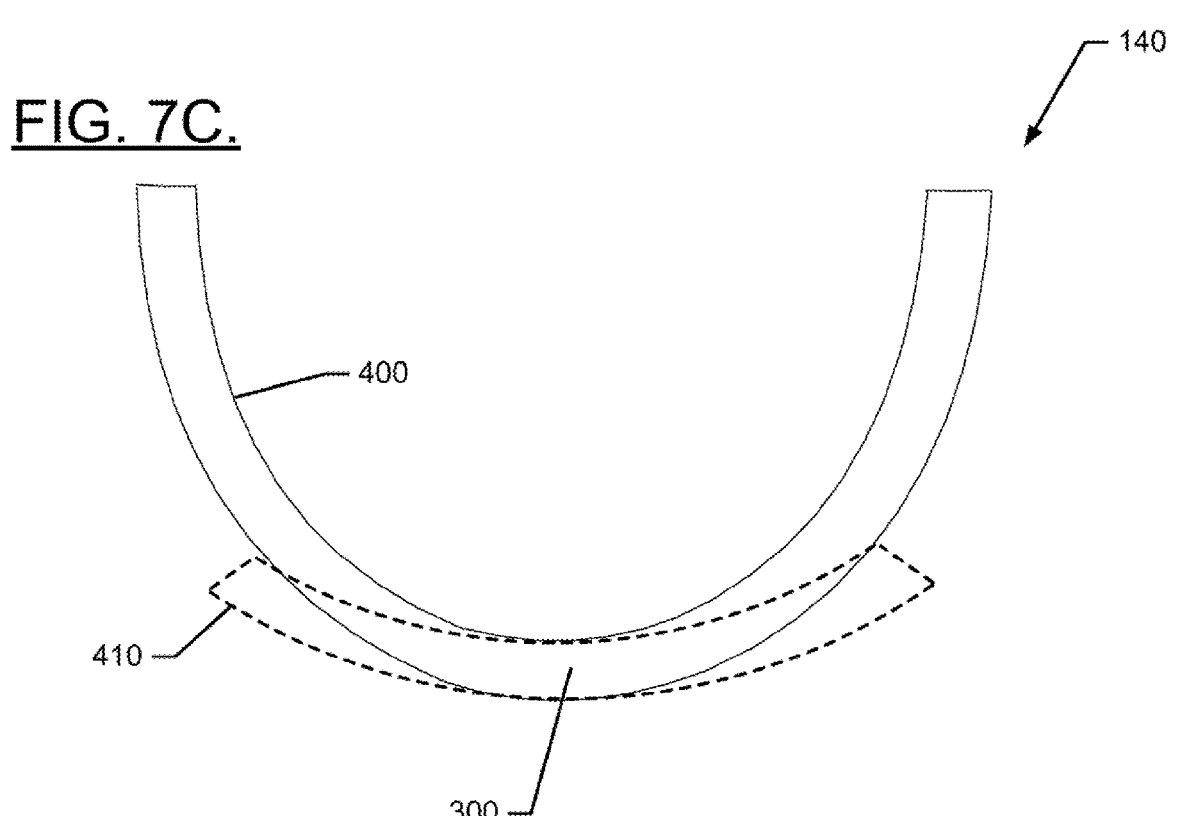
FIG. 7C illustrates a front view of the blade with a different concavity difference in accordance with an example embodiment.

As noted above, some example embodiments may be made by simply taking the metallic strip 200 and cutting off the lateral sides 210 over the selected length (Lc). Doing so ensures the same thickness for the metallic strip material 300 throughout the full length of the blade 140. As also noted above, cupping may be applied to the blade 140. The cupping may be applied such that either the same or different profiles may be achieved for the metallic strip material 300 in each of the treated blade portion 250 and the untreated blade portion 240. FIGS. 7A, 7B and 7C illustrate different cupping strategies that may be employed in various different examples.

In this regard, FIGS. 7A, 7B, 7C and 7D each represent a front view looking down the length of the blade 140 from a cut taken along line A-A' in FIG. 5. The solid line 400 represents a profile of the metallic strip material 300 in the untreated blade portion 240 and the dashed line 410 represents a profile of the metallic strip material 300 in the treated blade portion 250.

In the example of FIG. 7A, the metallic strip material 300 is bent for cupping to have the same profile in each of the untreated blade portion 240 and the treated blade portion 250. Providing the same profile over each portion may be relatively simple, since no different bending equipment (or modifications thereto) need by employed for providing the cupping. However, certain advantages may be obtained by employing other strategies. For example, by increasing the concavity of the metallic strip material 300 in the treated blade portion 250 relative to the concavity of the metallic strip material 300 in the untreated blade portion 240, an increase in longitudinal stability may be provided. Accordingly, more material may be removed from the lateral sides 210 (i.e., increasing the value of the removal width (Wr)) or the length over which the lateral sides 210 are cut away may be increased. An example of this strategy is shown in FIG. 7B.

FIG. 7C illustrates an opposite modification of the treated blade portion 250 relative to that shown in FIG. 7B. In this regard, in FIG. 7C the concavity of the metallic strip material 300 in the treated blade portion 250 is decreased relative to the concavity of the metallic strip material 300 in the untreated blade portion 240. By making this modification, the center of gravity may be moved closer to the bottom of the blade 140, which may reduce the tendency for rollover. Additionally, decreased concavity may enable the edges of the blade 140 to lay closer to the medium or material that is being measured, thereby making it easier to accurately make markings relative to the measurement markings 270.

Figure 7D:
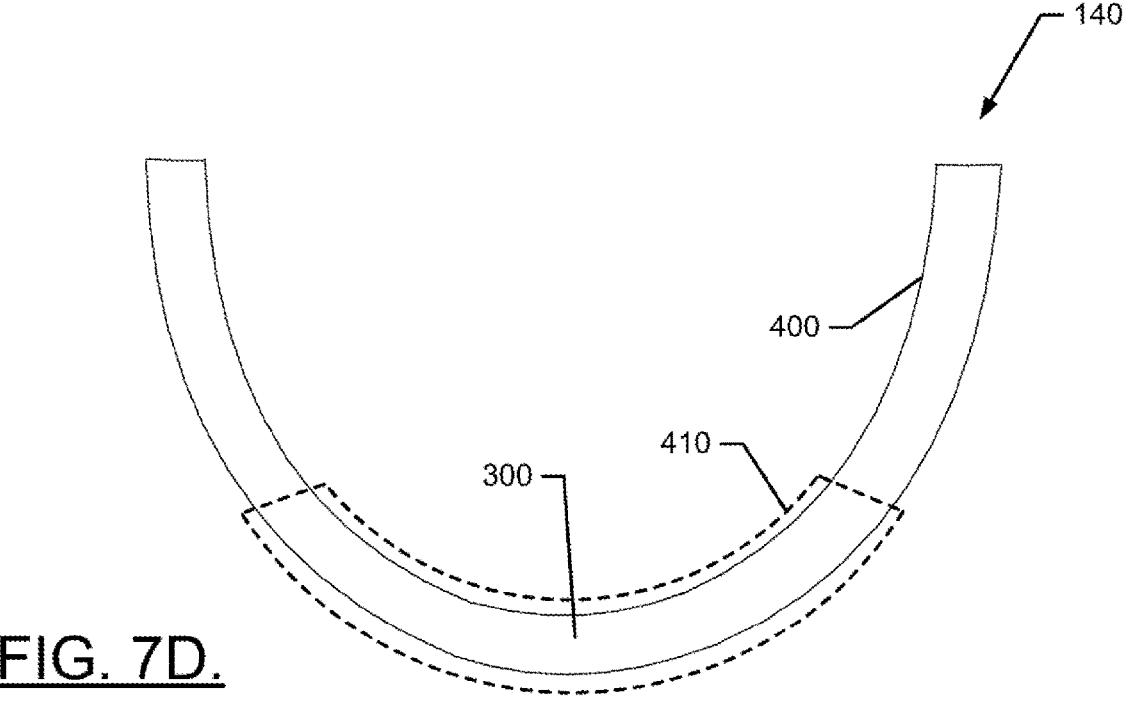
FIG. 7D illustrates the blade with different thicknesses of the metallic strip material used to form the blade in respective different parts in accordance with an example embodiment.

As shown in FIG. 7D, changes to the amount of cupping are not the only changes that can be made. For example, the metallic strip material 300 in each of the treated blade portion 250 and the untreated blade portion 240 could have a different thickness. FIG. 7D shows the metallic strip material 300 in the treated blade portion 250 being thicker than the metallic strip material 300 in the untreated blade portion 240. This may add longitudinal rigidity and therefore provide similar benefits to those discussed above in reference to FIG. 7B. If instead, the thickness of the metallic strip material 300 in the treated blade portion 250 was thinner than the metallic strip material 300 in the untreated blade portion 240, the mass of treated blade portion 250 may be reduced, so that the blade 140 is more flexible in that region. This may enable less material to be removed in the taper to achieve the same rotation of the end hook 170.

FIG. 8 is a block diagram of a method of producing a blade for a tape measuring device. As shown in FIG. 8, the method may include cutting by rollers or die cutting a metallic strip of material to define a first portion having a first width and a second portion having a second width, which is less than the first width, at operation 500. The method may further include applying a first layer of polymeric film to each of the first and second portions, where the first layer of polymeric film has a width substantially equal to the second width at operation 510. The method may also include providing measurement markings on the blade at operation 520. In some cases, providing the measurement markings on the blade may include a selected one of 1) printing the measurement markings on lateral edges of the metallic strip of material in each of the first and second portions, 2) printing the measurement markings on the first film layer in each of the first and second portions, and 3) printing the measurement markings on a printing medium disposed between the first film layer and a second film layer in the first portion, and disposed between the first film layer and a lateral edge of the metallic strip of material in the second portion.

In an example embodiment, a measuring tape device (or a blade for such device) may be provided. The measuring tape device may include a housing having an aperture, a reel assembly enclosed within the housing, a blade formed from a metallic strip of material having a first end configured to extend from the housing through the aperture and a second end configured to be wound on the reel assembly, and an end hook disposed at the first end of the blade to engage an object for measurement. A first portion of the metallic strip of material may extend between the first end and a transition region, and a second portion of the metallic strip of material may extend between the transition region and the second end. A width of the metallic strip of material in the first portion may be less than a width of the metallic strip of material in the second portion.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, in some cases the width of the metallic strip of material in the first portion may be about 30% to about 80% of the width of the metallic strip of material in the second portion. In an example embodiment, about 10% to about 33% of the width of the metallic strip of material in the second portion may be removed from each lateral side of the metallic strip of material in the first portion. In some cases, a first film layer having a constant width may be disposed over each of the first portion and the second portion. In an example embodiment, the constant width of the first film layer may be substantially equal to the width of the metallic strip of material in the second portion. In some cases, measurement markings may be disposed at the metallic strip of material in each of the first and second portions, on the first film layer in each of the first and second portions, or may be printed on a printing medium disposed between the first film layer and a second film layer in the first portion and disposed between the first film layer and a lateral edge of the metallic strip of material in the second portion. In an example embodiment, a cupping profile of the metallic strip of material is substantially equal in the first and second portions. In some cases, the metallic strip of material may be cupped to form a concave shape in each of the first and second portions, and concavity may be greater in the first portion than the second portion. However, as an alternative, concavity may be greater in the second portion than the first portion. In an example embodiment, the metallic strip of material may be cupped to form a concave shape in each of the first and second portions, and a thickness of the metallic strip of material may be greater in the first portion than the second portion. Alternatively, the thickness may be greater in the second portion than the first portion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A blade for a measuring tape device, the blade comprising:

a first end at which an end hook is configurable;

a second end configured to be operably coupled to a reel assembly;

a first portion of a metallic strip of material extending between the first end and a transition region; and a second portion of the metallic strip of material extending between the transition region and the second end, wherein a width of the metallic strip of material in the first portion is less than a width of the metallic strip of material in the second portion, and wherein about 10% to about 33% of the width of the metallic strip of material in the second portion is removed from each lateral side of the metallic strip of material in the first portion.

2. The blade of claim 1, wherein the width of the metallic strip of material in the first portion is about 30% to about 80% of the width of the metallic strip of material in the second portion.

3. The blade of claim 1, wherein a first film layer having a constant width is disposed over each of the first portion and the second portion.

4. The blade of claim 3, wherein the constant width of the first film layer is substantially equal to the width of the metallic strip of material in the second portion.

5. The blade of claim 4, wherein measurement markings are disposed at the metallic strip of material in each of the first and second portions.

6. The blade of claim 4, wherein measurement markings are disposed on the first film layer in each of the first and second portions.

7. The blade of claim 4, wherein measurement markings are printed on a printing medium disposed between the first film layer and a second film layer in the first portion, and disposed between the first film layer and a lateral edge of the metallic strip of material in the second portion.

8. The blade of claim 4, wherein a cupping profile of the metallic strip of material is substantially equal in the first and second portions.

9. The blade of claim 4, wherein the metallic strip of material is cupped to form a concave shape in each of the first and second portions, and wherein concavity is greater in the first portion than the second portion.

10. The blade of claim 4, wherein the metallic strip of material is cupped to form a concave shape in each of the first and second portions, and wherein concavity is greater in the second portion than the first portion.

11. The blade of claim 4, wherein the metallic strip of material is cupped to form a concave shape in each of the first and second portions, and wherein a thickness of the metallic strip of material is greater in the first portion than the second portion.

12. The blade of claim 4, wherein the metallic strip of material is cupped to form a concave shape in each of the first and second portions, and wherein a thickness of the metallic strip of material is greater in the second portion than the first portion.

13. The blade of claim 1, wherein a lateral side of the metallic strip of material is removed in the first portion via die cutting.

14. The blade of claim 1, wherein a lateral side of the metallic strip of material is removed in the first portion via cutting by rollers.

15. The blade of claim 1, wherein a distance from the first end to the transition region is less than about 48 inches.

16. A measuring tape device comprising:

a housing having an aperture;

a reel assembly enclosed within the housing;

a blade formed from a metallic strip of material having a first end configured to extend from the housing through the aperture and a second end configured to be wound on the reel assembly; and an end hook disposed at the first end of the blade to engage an object for measurement, wherein a first portion of the metallic strip of material extends between the first end and a transition region, and a second portion of the metallic strip of material extends between the transition region and the second end, wherein a width of the metallic strip of material in the first portion is less than a width of the metallic strip of material in the second portion, and wherein about 10% to about 33% of the width of the metallic strip of material in the second portion is removed from each lateral side of the metallic strip of material in the first portion.

17. The measuring tape device of claim 16, wherein the width of the metallic strip of material in the first portion is about 30% to about 80% of the width of the metallic strip of material in the second portion.

18. The measuring tape device of claim 16, wherein a first film layer having a constant width substantially equal to the width of the metallic strip of material in the second portion is disposed over each of the first portion and the second portion.

19. The measuring tape device of claim 18, wherein measurement markings are disposed:

at the metallic strip of material in each of the first and second portions;

on the first film layer in each of the first and second portions; or on a printing medium disposed between the first film layer and a second film layer in the first portion, and disposed between the first film layer and a lateral edge of the metallic strip of material in the second portion.

20. A method of producing a blade for a tape measuring device, the method comprising:

cutting by rollers or die cutting a lateral side of a metallic strip of material, for removal, to define a first portion having a first width and a second portion having a second width, which is less than the first width;

applying a first layer of polymeric film to each of the first and second portions, the first layer of polymeric film having a width substantially equal to the second width; and providing measurement markings on the blade, wherein providing the measurement markings comprises a selected one of:

printing the measurement markings on lateral edges of the metallic strip of material in each of the first and second portions;

printing the measurement markings on the first film layer in each of the first and second portions; and printing the measurement markings on a printing medium disposed between the first film layer and a second film layer in the first portion, and disposed between the first film layer and a lateral edge of the metallic strip of material in the second portion.

* * * * *